United States Patent
Grover et al.

(10) Patent No.: US 9,563,933 B2
(45) Date of Patent: Feb. 7, 2017

(54) METHODS FOR REDUCING MEMORY SPACE IN SEQUENTIAL OPERATIONS USING DIRECTED ACYCLIC GRAPHS

(71) Applicant: Nvidia Corporation, Santa Clara, CA (US)

(72) Inventors: Vinod Grover, Redmond, WA (US); Mahesh Ravishankar, Redmond, WA (US)

(73) Assignee: Nvidia Corporation, Santa Clara, CA (US)

( * ) Notice: Subject to any disclaimer, the term of this patent is extended or adjusted under 35 U.S.C. 154(b) by 376 days.

(21) Appl. No.: 14/165,789

(22) Filed: Jan. 28, 2014

(65) Prior Publication Data

US 2015/0212933 A1 Jul. 30, 2015

(51) Int. Cl.
G06T 1/60 (2006.01)
G06F 9/44 (2006.01)
G06F 9/45 (2006.01)

(52) U.S. Cl.
CPC . *G06T 1/60* (2013.01); *G06F 8/34* (2013.01); *G06F 8/4434* (2013.01)

(58) Field of Classification Search
None
See application file for complete search history.

(56) References Cited

U.S. PATENT DOCUMENTS

| | | | | |
|---|---|---|---|---|
| 2005/0257195 A1* | 11/2005 | Morrow | ............ | G06F 8/34 717/109 |
| 2010/0175049 A1* | 7/2010 | Ramsey | ............ | G06F 9/45512 717/115 |
| 2013/0063472 A1* | 3/2013 | Marison | ............ | G06T 15/80 345/591 |

* cited by examiner

Primary Examiner — Joni Richer
(74) Attorney, Agent, or Firm — Kevin Brown; Parker Justiss, P.C.

(57) ABSTRACT

Various disclosed embodiments are directed to methods and systems for reducing memory space in sequential computer-implemented operations. The method includes generating a directed acyclic graph (DAG) having a plurality of vertices and directed edges, wherein each edge connects a predecessor vertex to a successor vertex. Each vertex represents one of the computer-implemented operations and each directed edge represents output data generated by the operations. The method includes merging one of the predecessor vertex with one of the successor vertex by combining the operations of the predecessor vertex and the successor vertex if the predecessor and successor vertices are connected by a directed edge and there is only one directed edge originating from the predecessor vertex. The merger of the predecessor and the successor vertices reduces the number of directed edges in the DAG, resulting in a reduction of intermediate buffer memory required to store the output data.

18 Claims, 3 Drawing Sheets

METHODS FOR REDUCING MEMORY SPACE IN SEQUENTIAL OPERATIONS USING DIRECTED ACYCLIC GRAPHS

TECHNICAL FIELD

The present disclosure is directed, in general, to methods for reducing memory space in sequential computer-implemented operations.

BACKGROUND

In a typical data processing operation, tasks are typically performed by a computer in a sequence subject to constraints that certain tasks be performed before others. As each task is performed, data is transformed or manipulated, and the resulting output is temporarily stored in a buffer memory to be used as input for the next task.

Consider, for example, an image processing application wherein multiple filters are applied to pixels of an image. A first filter may receive red, green and blue values of the pixels and compute gray values of the pixels using, for example, the equation:

$$gray=0.021216*r+0.7152*g+0.0722*b,$$

where r, g, and b are respective red, green and blue values of the pixels.

A second filter may compute standard deviation for the pixels. A third filter may compute exposure values of the pixels using, for example, the equation:

$$Exp=e^{-12.5*(r-0.5)2}*e^{-12.5*(g-0.5)2}*e^{-12.5*(b-0.5)2}.$$

A fourth filter may be a laplacian filter for performing a 3×3 convolution operation of the gray values of the pixel to detect edges. Various other filters may be applied to the pixels for further image processing as those skilled in the pertinent art will appreciate.

According to existing methods, the aforementioned operations may be implemented in a system which provides intermediate storage for the intermediate results of each filter operations. The system may, for example, allocate a buffer memory for storing the intermediate results of each filter operation. Since each intermediate result must be written in the allocated buffer memory, existing methods require increased memory usage and high memory bandwidth.

SUMMARY

Various disclosed embodiments are directed to methods and systems for reducing memory space in sequential computer-implemented operations.

According to certain disclosed embodiments, the method includes generating a directed acyclic graph (DAG) having a plurality of vertices and directed edges, each edge connecting a predecessor vertex to a successor vertex. Each vertex represents one of the computer-implemented operations and each directed edge represents output data generated by the operations. The output data from the predecessor vertices are received as input data by the successor vertices.

The method includes merging one of the predecessor vertex with one of the successor vertex by combining the operations of the predecessor vertex and the successor vertex if the predecessor and successor vertices are connected by a directed edge and there is only one directed edge originating from the predecessor vertex. The method includes generating a modified DAG by replacing the predecessor and successor vertices with the merged vertex, wherein the merger of the predecessor and the successor vertices reduces the number of directed edges in the DAG.

The method includes repeating the aforementioned steps until there are no predecessor and successor vertices that can be merged under the aforementioned conditions. The method includes allocating memory space for the output data represented by the directed edges and storing the output data in the allocated memory space. The reduction of the number of directed edges reduces the memory space required to store the output data. The memory space is allocated by a processor.

According to certain disclosed embodiments, a non-transitory computer-readable medium encoded with computer-executable instructions reduces memory space in sequential computer-implemented operations. The computer-executable instructions when executed cause at least one data processing system to: (a) generate a directed acyclic graph (DAG) having a plurality of vertices and directed edges, each edge connecting a predecessor vertex to a successor vertex, each vertex representing one of the computer-implemented operations and each directed edge representing output data generated by the operations, and wherein the output data from the predecessor vertices are received as input data by the successor vertices; (b) merge one of the predecessor vertex with one of the successor vertex by combining the operations of the predecessor vertex and the successor vertex into an operation in a merged vertex if the predecessor vertex and the successor vertex are connected by a directed edge, and there is only one directed edge out of the predecessor vertex; (c) generate a modified DAG by replacing the predecessor and successor vertices with the merged vertex, wherein the merger of the predecessor and the successor vertices reduces the number of directed edges in the DAG; (d) repeat steps (a) through (c) until there are no predecessor and successor vertices that can be merged; and (e) allocate memory space for the output data represented by the directed edges; and (f) store the output data in the allocated memory space.

BRIEF DESCRIPTION

Reference is now made to the following descriptions taken in conjunction with the accompanying drawings, in which.

Figure 3A:
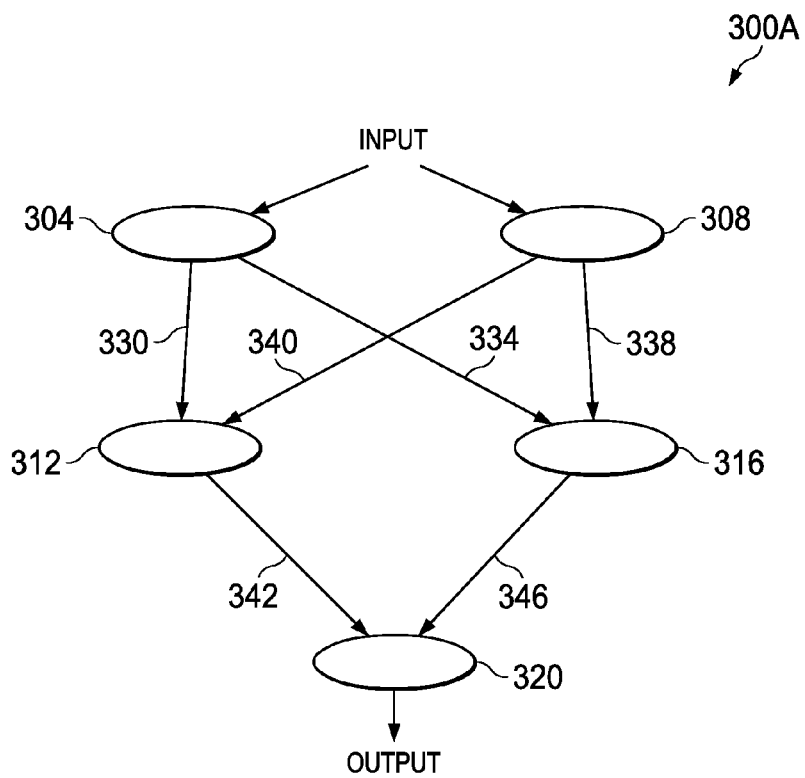
Figure 3B:
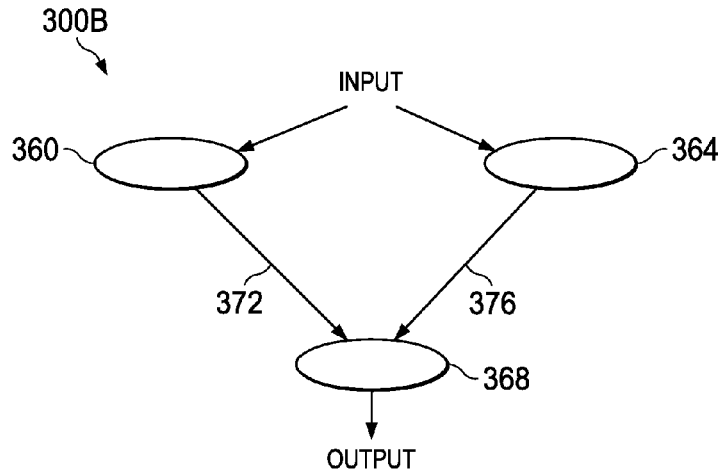
Figure 3C:
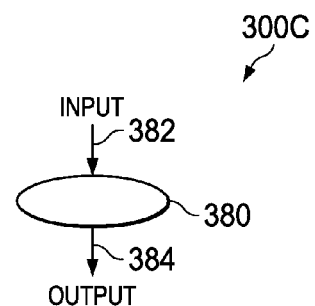

FIGS. 3A-C illustrate reduction of memory usage using a DAG; and

Figure 4:
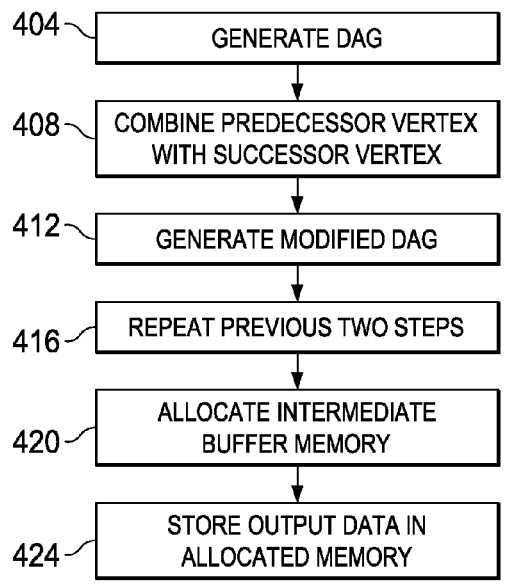

FIG. 4 is a flowchart of a process according to certain disclosed embodiments.

DETAILED DESCRIPTION

FIGS. 1-4, discussed below, and the various embodiments used to describe the principles of the present disclosure are by way of illustration only and should not be construed in any way to limit the scope of the disclosure. Those skilled in the pertinent art will recognize that the principles of the disclosure may be implemented in any suitably arranged device or a system. The numerous innovative teachings of the present disclosure will be described with reference to exemplary non-limiting embodiments.

Figure 1:
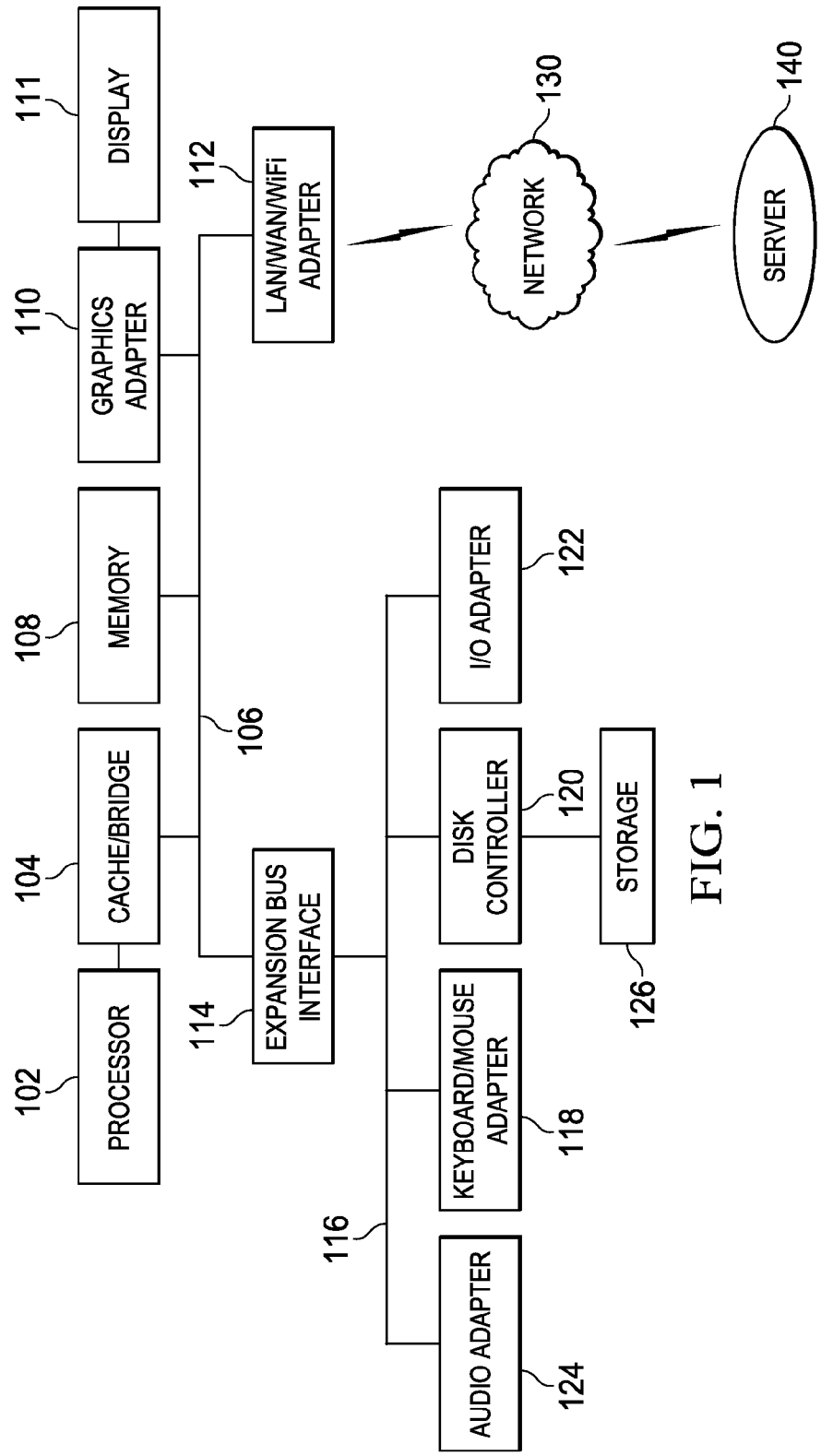
FIG. 1 illustrates a block diagram of a data processing system according to certain disclosed embodiments.

FIG. 1 depicts a block diagram of data processing system 100 in which an embodiment can be implemented, for example, as a system particularly configured by software, hardware or firmware to perform the processes as described herein, and in particular as each one of a plurality of interconnected and communicating systems as described herein.

Referring to FIG. 1, the data processing system depicted includes processor 102 connected to level two cache/bridge 104, which is connected in turn to local system bus 106. Local system bus 106 may be, for example, a peripheral component interconnect (PCI) architecture bus. Also connected to local system bus in the depicted example are main memory 108 and graphics adapter 110. Graphics adapter 110 may be connected to display 111.

Other peripherals, such as local area network (LAN)/Wide Area Network/Wireless (e.g., WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. Storage 126 may be used to store an application configured to reduce memory usage in computer-implemented operations in accordance with certain disclosed embodiments.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

Data processing system 100 in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

LAN/WAN/Wireless adapter 112 can be connected to network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100. Data processing system 100 may be configured as a workstation, and a plurality of similar workstations may be linked via a communication network to form a distributed system in accordance with embodiments of the disclosure.

According to certain disclosed embodiments, memory usage in sequential computer-implemented operations is reduced by representing the computer-implemented operations by a directed acyclic graph (DAG), and combining vertices of the DAG to reduce the number of directed edges. According to certain disclosed embodiments, the number of directed edges of a DAG represents the number of intermediate memory buffers needed for storage of intermediate results of the computer-implemented operations. Thus, a reduction of the number of directed edges reduces the number of intermediate memory buffers required for the computer-implemented operations.

It will be understood by those skilled in the pertinent art that a DAG is a directed graph with no directed cycles. The DAG has a plurality of vertices and directed edges, each directed edge connecting a predecessor vertex to a successor vertex.

According to certain disclosed embodiments, each vertex represents one of the computer-implemented operations and each directed edge represents the results of the operation (i.e. output data). As discussed before, the results of the operations or output data are temporarily stored in intermediate buffer memory.

Figure 2:
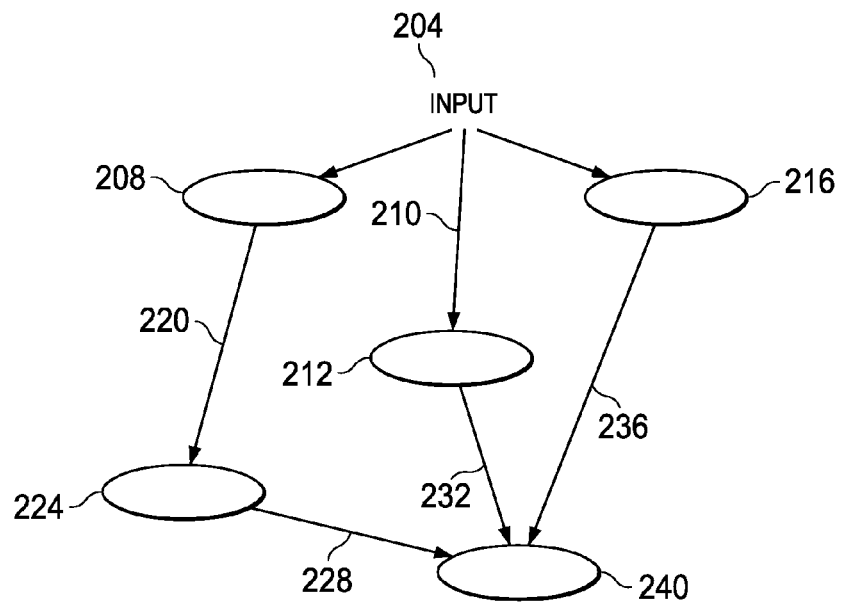
FIG. 2 illustrates a DAG.

FIG. 2 illustrates DAG 200 which has a plurality of vertices and directed edges. DAG 200 illustrates exemplary image processing operations performed by filters.

Referring to FIG. 2, pixels contained in image 204 (image 1) are received by filter 208. Filter 208 takes red, green and blue (RGB) values of the pixels and computes gray value using the equation set forth before. The gray values are represented by directed edge 220.

The pixels in image 204 are also received by filter 212 which computes the standard deviation of the pixels. The output of filter 212 is represented by directed edge 232.

The pixels are also received by filter 216 which computes exposure values of the pixels using the equation set forth before. The output of filter 216 is represented by directed edge 236.

Filter 224 receives the gray values which are represented by directed edge 220 and performs a 3×3 convolution operation to detect edges. It will be appreciated that filter 224 is an edge detection filter which is also known to as a laplacian filter. The output of filter 224 is represented by directed edge 228.

As shown in FIG. 2, directed edges 228, 232, 236 representing respective values (i.e. output data) are received by filter 240. Filter 240 multiplies the received values, and generates a weight factor for image 204. The weight factor is represented by directed edge 244. In typical image processing applications, the foregoing algorithm may be repeated for many images and their respective weight factors may be computed. The computed weight factors may be received by another filter (not shown in FIG. 2) which may calculate an average weight factor of the images.

According to certain disclosed embodiments, a predecessor vertex and a successor vertex in a DAG are combined (i.e. merged or fused) if the predecessor vertex and the successor vertex are connected by a directed edge, and there is only one directed edge originating from the predecessor vertex. Thus, the operations of the predecessor vertex and the successor vertex are combined into an operation in the merged vertex if the predecessor and successor vertices are connected by a directed edge and there is only one directed edge out of the predecessor vertex. By combining the predecessor and successor vertices, the number of directed edges in the DAG is reduced. Since the directed edges represent the results or output data of a computer-implemented task which are stored in intermediate buffer memory, the reduction of directed edges causes a reduction of buffer memory usage and reduction of bandwidth requirement.

According to certain disclosed embodiments, two vertices are combined or fused only if the fusion does not increase the amount of computation required. For example, if the output of filter 216 (shown in FIG. 2) is used as inputs for two other filters (instead of just one filter as shown in FIG. 2), combining filter 216 with a successor vertex would result in the value of exposure for each pixel being computed twice, one for each fused vertex. Consequently, the two vertices would not be combined in these disclosed embodiments.

According to certain disclosed embodiments, the number of intermediate memory buffers needed is minimized. To minimize the number of intermediate memory buffers needed, it is necessary to perform as many fusions in a DAG under the aforementioned conditions. For a given DAG, performing all possible fusions that satisfy the conditions may uncover opportunities for further fusion, and FIGS. 3A-C illustrate this process.

In FIG. 3A, DAG 300A includes vertices 304, 308, 312, 316, 320, and also includes directed edges 330, 334, 338, 340, 342, 346. Vertices 312, 320 are connected by directed edge 342, and vertices 316, 320 are connected by directed edge 346. Also, only one directed edge (i.e. edge 342) originates from vertex 312, and only one directed edge (i.e. edge 346) originates from vertex 316. Consequently, vertices 312, 316, 320 in DAG 300A can be combined (fused) because they satisfy the aforementioned conditions.

FIG. 3B illustrates resulting DAG 300B after the fusion. DAG 300B includes vertices 360, 364, 368, and also includes directed edges 372, 376. It will be appreciated that computations represented by vertices 312, 316, 320 (shown in FIG. 3A) have been combined in vertex 368 (shown in FIG. 3B). Also, it will be appreciated that edges 330, 334, 338, 340, 342, 346, which are illustrated in FIG. 3A, are now replaced by edges 372, 376 illustrated in FIG. 3B. Thus, by combining vertices 312, 316, 320, the number of directed edges has been reduced by four, which reduces the number of intermediate memory buffers required.

As discussed before, in order to minimize the number of intermediate buffer memory needed, it is necessary to perform as many fusions as possible under the conditions. Accordingly, DAG 300B is analyzed to determine if further opportunity for fusion exists. Since vertices 360, 364, 368 satisfy the conditions discussed before, vertices 360, 364, 368 are combined as shown in FIG. 3C. As a result of the fusion, directed edges 372, 376 are eliminated, further reducing the number of intermediate buffer memories required. As illustrated in FIG. 3C, DAG 300C includes only one vertex (i.e. vertex 380) and two directed edges 382, 384. In DAG 300C, vertex 380 represents the operations of the vertices combined in the foregoing process. Since DAG 300C has only one directed edge (i.e. edge 384) originating from vertex 380, only one intermediate buffer is required to store the output data.

FIG. 4 is a flowchart of a process according to certain disclosed embodiments. Such a process can be performed by any apparatus configured to perform a process as described.

In block 404, a DAG having a plurality of vertices and directed edges is generated, wherein each directed edge connects a predecessor vertex to a successor vertex. Each vertex represents a computer-implemented operation and each directed edge represents output data generated by the operation. The output data from the predecessor vertices are received as input data by the successor vertices.

In block 408, a predecessor vertex is combined with a successor vertex by combining the operations of the predecessor vertex and the successor vertex into an operation in a merged vertex if the following conditions are satisfied: the predecessor and successor vertices are connected by a directed edge; and there is only one directed edge originating from the predecessor vertex.

In block 412, a modified DAG is generated by replacing the predecessor and successor vertices with the merged vertex. As discussed before, the merger of the predecessor and the successor vertices reduces the number of directed edges in the DAG.

In block 416, the aforementioned two steps are repeated until there are no predecessor and successor vertices that can be merged under the aforementioned conditions.

In block 420, intermediate buffer memory for the output data represented by the directed edges are allocated. In block 424, the output data is stored in the allocated memory.

According to certain disclosed embodiments, a non-transitory computer-readable medium encoded with computer-executable instructions reduces memory space in sequential computer-implemented operations. The computer-executable instructions when executed cause at least one data processing system to (a) generate a DAG having a plurality of vertices and directed edges, each edge connecting a predecessor vertex to a successor vertex, each vertex representing one of the computer-implemented operations and each directed edge representing output data generated by the operations, and wherein the output data from the predecessor vertices are received as input data by the successor vertices; (b) merge one of the predecessor vertex with one of the successor vertex by combining the operations of the predecessor vertex and the successor vertex into an operation in a merged vertex if the predecessor vertex and the successor vertex are connected by a directed edge, and there is only one directed edge out of the predecessor vertex; (c) generate a modified DAG by replacing the predecessor and successor vertices with the merged vertex, wherein the merger of the predecessor and the successor vertices reduces the number of directed edges in the DAG; (d) repeat steps (a) through (c) until there are no predecessor and successor vertices that can be merged; and (e) allocate memory space for the output data represented by the directed edges; and (f) store the output data in the allocated memory space.

Those skilled in the pertinent art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the pertinent art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as ROMs or EEPROMs, and user-recordable type mediums such as floppy disks, hard disk drives and CD-ROMs or DVDs.

Those skilled in the art to which this application relates will appreciate that other and further additions, deletions, substitutions and modifications may be made to the described embodiments.

What is claimed is:

1. A method for reducing memory space in sequential computer-implemented operations, comprising:
   (a) generating a directed acyclic graph (DAG) having a plurality of vertices and directed edges, each edge connecting a predecessor vertex to a successor vertex, each vertex representing one of the computer-implemented operations and each directed edge representing output data generated by the operations, and wherein the output data from the predecessor vertices are received as input data by the successor vertices;
   (b) merging one of the predecessor vertex with one of the successor vertex by combining the operations of the predecessor vertex and the successor vertex into an operation in a merged vertex if the predecessor and successor vertices are connected by a directed edge, and there is only one directed edge out of the predecessor vertex;
   (c) generating a modified DAG by replacing the predecessor and successor vertices with the merged vertex, wherein the merger of the predecessor and the successor vertices reduces the number of directed edges in the DAG;
   (d) repeating steps (a) through (c) until there are no predecessor and successor vertices that can be merged; and
   (e) allocating memory space for the output data represented by the directed edges; and
   (f) storing the output data in the allocated memory space.

2. The method as recited in claim 1, wherein each directed edge originates from one of the predecessor vertices and is incident on one of the successor vertices.

3. The method as recited in claim 1, wherein the reduction of the number of directed edges reduces the memory space required to store the output data.

4. The method as recited in claim 1, further comprising repeating steps (a) through (c) until conditions of step (b) are no longer satisfied.

5. The method as recited in claim 1, wherein the memory space is allocated by a processor.

6. The method as recited in claim 1, wherein the computer-implemented operations are implemented by a processor.

7. The method as recited in claim 1, wherein the computer-implemented operations are image processing operations.

8. The method as recited in claim 1, wherein the computer-implemented operation is a filter in an image processing operation.

9. The method as recited in claim 1, wherein the allocated memory space is a buffer memory.

10. A non-transitory computer-readable medium encoded with computer-executable instructions for reducing memory space in sequential computer-implemented operations, wherein the computer-executable instructions when executed cause at least one data processing system to:
    (a) generate a directed acyclic graph (DAG) having a plurality of vertices and directed edges, each edge connecting a predecessor vertex to a successor vertex, each vertex representing one of the computer-implemented operations and each directed edge representing output data generated by the operations, and wherein the output data from the predecessor vertices are received as input data by the successor vertices;
    (b) merge one of the predecessor vertex with one of the successor vertex by combining the operations of the predecessor vertex and the successor vertex into an operation in a merged vertex if the predecessor vertex and the successor vertex are connected by a directed edge, and there is only one directed edge out of the predecessor vertex;
    (c) generate a modified DAG by replacing the predecessor and successor vertices with the merged vertex, wherein the merger of the predecessor and the successor vertices reduces the number of directed edges in the DAG;
    (d) repeat steps (a) through (c) until there are no predecessor and successor vertices that can be merged; and
    (e) allocate memory space for the output data represented by the directed edges; and
    (f) store the output data in the allocated memory space.

11. The non-transitory computer-readable medium of claim 10, wherein each directed edge originates from one of the predecessor vertices and is incident on one of the successor vertices.

12. The non-transitory computer-readable medium of claim 10, wherein the reduction of the number of directed edges reduces the memory space required to store the output data.

13. The non-transitory computer-readable medium of claim 10, wherein the computer-executable instructions when executed cause at least one data processing system to repeat steps (a) through (c) until conditions of step (b) are no longer satisfied.

14. The non-transitory computer-readable medium of claim 10, wherein the memory space is allocated by a processor.

15. The non-transitory computer-readable medium of claim 10, wherein the computer-implemented operations are implemented by a processor.

16. The non-transitory computer-readable medium of claim 10, wherein the computer-implemented operations are image processing operations.

17. The non-transitory computer-readable medium of claim 10, wherein the computer-implemented operation is a filter in an image processing operation.

18. The non-transitory computer-readable medium of claim 10, wherein the allocated memory space is a buffer memory.

* * * * *